(12) United States Patent
Shinyashiki et al.

(10) Patent No.: US 9,276,240 B2
(45) Date of Patent: Mar. 1, 2016

(54) LAMINATE BATTERY HOUSING FLAT ELECTRODE ASSEMBLY AND MANUFACTURING METHOD THEREFOR

(71) Applicant: Sanyo Electric Co., Ltd., Moriguchi, Osaka (JP)

(72) Inventors: Yoshitaka Shinyashiki, Kobe (JP); Tadatsugu Ogawa, Sumoto (JP)

(73) Assignee: SANYO Electric Co., Ltd., Osaka (JP)

( * ) Notice: Subject to any disclaimer, the term of this patent is extended or adjusted under 35 U.S.C. 154(b) by 551 days.

(21) Appl. No.: 13/630,393

(22) Filed: Sep. 28, 2012

(65) Prior Publication Data

US 2013/0084484 A1    Apr. 4, 2013

(30) Foreign Application Priority Data

Sep. 30, 2011   (JP) ................................. 2011-216634

(51) Int. Cl.
*H01M 2/02* (2006.01)
*H01M 10/00* (2006.01)
*H01M 10/02* (2006.01)
*H01M 10/04* (2006.01)
H01M 10/0525 (2010.01)

(52) U.S. Cl.
CPC .......... *H01M 2/0212* (2013.01); *H01M 10/049* (2013.01); *H01M 10/0436* (2013.01); *H01M 10/0525* (2013.01); *Y02T 10/7011* (2013.01); *Y10T 29/4911* (2015.01)

(58) Field of Classification Search
None
See application file for complete search history.

(56) References Cited

U.S. PATENT DOCUMENTS

| | | | |
|---|---|---|---|
| 2003/0049527 A1* | 3/2003 | Yageta et al. | 429/179 |
| 2004/0106038 A1* | 6/2004 | Shimamura et al. | 429/152 |
| 2009/0197160 A1* | 8/2009 | Fujiwara et al. | 429/146 |

FOREIGN PATENT DOCUMENTS

| | | |
|---|---|---|
| JP | 2005-203140 A | 7/2005 |
| JP | 2010-192154 A | 9/2010 |

* cited by examiner

*Primary Examiner* — Ula C Ruddock
*Assistant Examiner* — Matthew Van Oudenaren
(74) *Attorney, Agent, or Firm* — Westerman, Hattori, Daniels & Adrian, LLP (57) ABSTRACT

A laminate battery comprising: a flat electrode assembly having a main face and a side face having a smaller area than the main face; and a laminate casing having a cup portion that is capable of housing therein the electrode assembly. The laminate casing is sealed with the electrode assembly housed in the cup portion and has a reduced pressure interior. The cup portion includes a base portion that covers the main face of the electrode assembly, a side portion that extends along the side face of the electrode assembly, and a bend portion that extends from the base portion beyond the side face of the electrode assembly, forms a bend towards the side face of the electrode assembly, and connects with the side portion. An angle of a vertex of the bend is within a range of 40° to 85° inclusive.

5 Claims, 4 Drawing Sheets

LAMINATE BATTERY HOUSING FLAT ELECTRODE ASSEMBLY AND MANUFACTURING METHOD THEREFOR

CROSS REFERENCE TO RELATED APPLICATION

The disclosure of Japanese Patent Application No. 2011-216634 filed Sep. 30, 2011 including specification, drawings and claims is incorporated herein by reference in its entirety.

TECHNICAL FIELD

The present invention relates to a laminate battery that is used as a power source for portable devices, robots, electric vehicles, etc., and a method for manufacturing such a laminate battery.

BACKGROUND ART

A non-aqueous electrolyte secondary battery such as a lithium-ion battery is used as a power source for portable devices such as mobile phones, laptop computers, and PDAs.

As for types of electrode assemblies used in lithium-ion batteries, there are two types, one being a spiral electrode assembly, in which a positive electrode plate and a negative electrode plate are spirally wound with a separator therebetween, and the other being a stacked electrode assembly, in which a plurality of quadrilateral electrodes are stacked one on top of another. Further, as an outer casing for a lithium-ion battery, a laminate casing composed of laminate film that is formed so as to have a cup-shape is used.

As disclosed in Patent Literature 1, such a laminate battery is manufactured by disposing, so as to be contained in a laminate casing formed to have a cup-shape, a flat electrode assembly and a non-aqueous electrolyte and by weld sealing the laminate casing while putting an interior of the laminate casing in a reduced pressure state.

Furthermore, laminate batteries having large sizes, which are used as drive power sources for driving robots, electric vehicles, etc., are being manufactured.

CITATION LIST

Patent Literature

[Patent Literature 1]
  Japanese Patent Application Publication No. 2005-203140

SUMMARY OF INVENTION

Technical Problem

In the course of developing a large-sized laminate battery, the inventors of the present invention found that, when forming, in a laminate casing, a cup portion that is capable of housing a large-sized electrode assembly (e.g., a cup portion having longitudinal and lateral sides having lengths equal to or longer than 90 mm and a depth equal to or greater than 5 mm), it is desirable that the laminate casing be formed such that looseness exists in a base of the cup portion. This is since, the formation of looseness in the base of the cup portion prevents problems occurring in the laminate casing such as the local formation of areas having relatively small thicknesses than other areas and the occurrence of cracks. However, when an electrode assembly and a non-aqueous electrolyte are disposed so as to be contained in a laminate casing having looseness formed in the base of the cup portion, and sealing of the laminate casing is performed while putting an interior of the laminate casing in a reduced pressure state (i.e., a state where the pressure of the interior of the laminate casing is lower than atmospheric pressure), there is a high risk of wrinkles being formed in the base of the cup portion, which is problematic.

More specifically, the formation of wrinkles in the base of the cup portion of the laminate casing is problematic since, as a result, uneven construction pressure is applied to the electrode assembly included in the laminate casing, and accordingly, long-term cycle characteristics of the laminate battery are deteriorated.

In view of such problems, the present invention provides, as one aspect thereof, a laminate battery which includes a flat electrode assembly having a main face and a side face smaller in area than the main face and a laminate casing that is capable of housing therein the flat electrode assembly and in which the laminate casing is sealed with the electrode assembly housed in the cup portion and has a reduced pressure interior, which suppresses the formation of wrinkles in a base of the cup portion of the laminate casing and thereby achieves excellent long-term cycle characteristics.

Solution to the Problems

One aspect of the present invention is a laminate battery comprising: a flat electrode assembly having a main face and a side face having a smaller area than the main face; and a laminate casing having a cup portion that is capable of housing therein the electrode assembly, wherein the laminate casing is sealed with the electrode assembly housed in the cup portion and has a reduced pressure interior, the cup portion includes: a base portion that covers the main face of the electrode assembly; a side portion that extends along the side face of the electrode assembly; and a bend portion that extends from the base portion beyond the side face of the electrode assembly, forms a bend towards the side face of the electrode assembly, and connects with the side portion, and an angle of a vertex of the bend is within a range of 40° to 85° inclusive.

Another aspect of the present invention is a manufacturing method for manufacturing a laminate battery, the manufacturing method comprising: a forming step of forming a laminate body by forming a cup portion in a laminate sheet, the cup portion capable of housing therein a flat electrode assembly having a main face and a side face having a smaller area than the main face; a disposing step of disposing the electrode assembly so as to be housed in the cup portion of the laminate body; and a sealing step of sealing the laminate body by covering an aperture of the cup portion of the laminate body with use of a laminate sheet while putting an interior of the laminate body in a reduced pressure state (a state where pressure is lower than atmospheric pressure), wherein the cup portion, when formed in the forming step, includes a base portion that covers the main face of the electrode assembly and a side portion that covers the side face of the electrode assembly, the base portion having a rectangular shape and a length of sides of the base portion at least in one of a longitudinal direction and a lateral direction is longer than a length of the electrode assembly in a corresponding direction, and the cup portion, after the laminate body is sealed in the sealing step, includes a base portion that covers the main face of the electrode assembly, a side portion that extends along the side face of the electrode assembly, and a bend portion that extends from the base portion beyond the side face of the electrode assembly, forms a bend towards the side face of the electrode assembly, and connects with the side portion, an angle of a vertex of the bend being within a range of 40° to 85° inclusive.

In the manufacturing method pertaining to one aspect of the present invention, in the sealing step, the laminate body may be sealed while the base portion of the cup portion, formed when the cup portion is formed in the forming step, is pressed against the main face of the electrode assembly by using a pressing member.

In the manufacturing method pertaining to one aspect of the present invention, a height of the side portion of the cup portion, when formed in the forming step, may be smaller than a thickness of the electrode assembly to be disposed in the disposing step.

Advantageous Effects of the Invention

According to the laminate battery pertaining to one aspect of the present invention and a laminate battery manufactured according to the manufacturing method pertaining to one aspect of the present invention, the laminate casing is sealed while putting an interior of the laminate body in a reduced pressure state. Due to this, pressing force resulting from atmospheric pressure is applied to the base portion and the side portion of the cup portion such that (i) the base portion is pressed against and thereby put into close contact with the main face of the electrode assembly, and (ii) the side portion is pressed against and thereby put into close contact with the side face of the electrode assembly.

As description is provided in the above, in the laminate casing, the cup portion includes the base portion, the bend portion, and the side portion. The bend portion extends from the base portion beyond the side face of the stacked electrode assembly, forms a bend towards the side face, and connects with the side portion, and the angle of the vertex of the bend is defined as being within a range of 40° to 85° inclusive. In other words, a protruding portion is formed at a boundary region between the base portion and the side portion. The protruding portion protrudes outwards with respect to the side face of the stacked electrode assembly, and a root portion Q of the protruding portion, which is located closer to the side portion than the base portion, is depressed towards the stacked electrode assembly, thereby forming a crease.

Further, when the cup portion of the laminate casing is formed so as to have the above-described shape, even when looseness exists in the base portion of the cup portion before the laminate casing is sealed, the looseness is pulled into the side portion and thereby absorbed when sealing of the laminate casing is performed. As such, although a crease may be formed in the side portion of the cup portion, the risk is reduced of wrinkles being formed in the base portion of the cup portion.

In addition, when the cup portion is formed such that the angle of the vertex of the bend of the bend portion is inappropriately small, the risk increases of cracks occurring due to excessive load being exerted on the vertex. However, since the angle of the vertex of the bend is set to be equal to or greater than 40° according to the present invention, the load exerted on the vertex is suppressed so as to be relatively small.

As such, the occurrence of cracks in the laminate casing is prevented even when the laminate battery is used for a long period of time.

The present invention is particularly effective when the electrode assembly is a stacked electrode assembly, in which positive electrode plates and negative electrode plates are alternately stacked one on top of another with a separator interposed between each stacked combination of a positive electrode plate and a negative electrode plate. In addition, the present invention is also particularly effective when the base portion of the cup portion has a rectangular shape, lengths of longitudinal and lateral sides of the base portion are equal to or greater than 90 mm, and a depth of the cup portion is equal to or greater than 5 mm.

Additionally, the formation of wrinkles in the base portion is further suppressed when, in the sealing step, the laminate body is sealed while the base portion of the cup portion, formed when the cup portion is formed in the forming step, is pressed against the main face of the electrode assembly by using a pressing member.

Further, in so as to provide the laminate casing after sealing with the above-described shape, it is preferable that a height of the side portion of the cup portion, when formed in the forming step, be set to be smaller than a thickness of the electrode assembly to be disposed in the disposing step.

BRIEF DESCRIPTION OF THE DRAWINGS

FIG. 4 is a perspective view illustrating an external appearance of a laminate casing 2a.

DESCRIPTION OF EMBODIMENT

In the following, description is provided on an embodiment of the present invention taking a lithium-ion battery as one example. However, the present invention is not limited to the following description, and various variations and modifications are also realizable, provided that such variations and modifications do not extend beyond the scope and spirit of the present invention.

<Structure of Laminate Battery 1>

Figure 1:
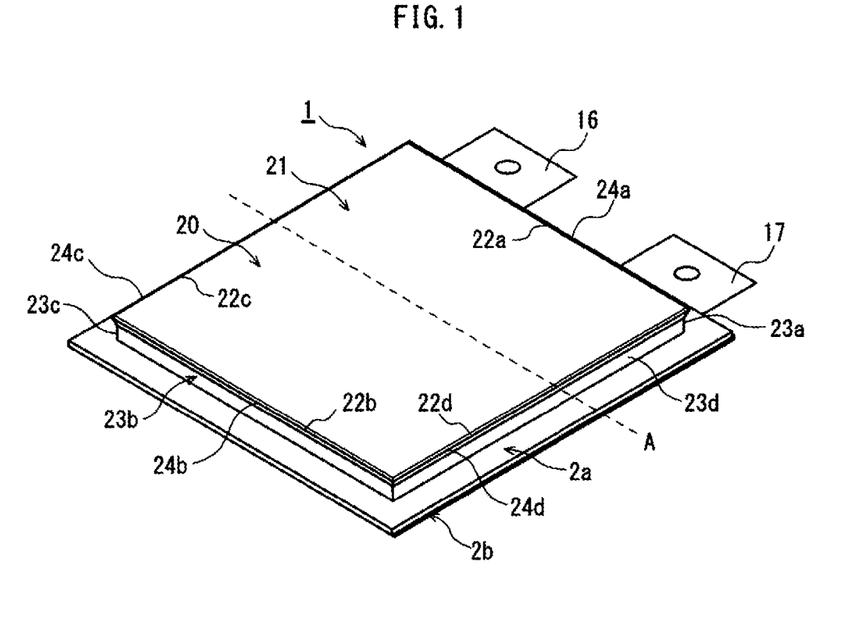
FIG. 1 illustrates an external appearance of a laminate battery 1.

FIG. 1 illustrates an external appearance of a laminate battery 1.

The laminate battery 1 includes a laminate casing 2a, a laminate casing 2b, a flat stacked electrode assembly 10, and a non-aqueous electrolyte solution. The stacked electrode assembly 10 and the non-aqueous electrolyte solution are contained inside a combination of the laminate casing 2a and the laminate casing 2b.

The laminate casing 2a and the laminate casing 2b are each formed of a laminate sheet in which resin layers are layered on both sides of a piece of aluminum foil.

The laminate casing 2a has formed therein a cup portion 20 for housing the stacked electrode assembly 10. In contrast, the laminate casing 2b does not have a cup portion formed therein and has a planar shape.

Weld sealing of the laminate casings 2a and 2b is performed by welding together outer edge portions of the laminate casings 2a and 2b while the stacked electrode assembly 10 and the non-aqueous electrolyte solution are contained in the cup portion 20 of the laminate casing 2a. After sealing of the laminate casings 2a and 2b is completed, an interior space of the sealed combination of the laminate casing 2a and the laminate casing 2b is in a reduced pressure state with lower pressure than atmospheric pressure.

A positive electrode current collector terminal 16 composed of an aluminum plate and a negative electrode current collector terminal 17 composed of a copper plate protrude from the sealed combination of the laminate casing 2a and the laminate casing 2b so as to penetrate one side (a lateral side) of the outer edge portions (sealed portions) of the sealed combination of the laminate casings 2a and 2b. Here, so as to improve adhesion between corresponding members, it is desirable that a resin film having thermal adhesiveness be disposed (i) between the positive electrode current collector terminal 16 and the laminate casing 2a, (ii) between the positive electrode current collector terminal 16 and the laminate casing 2b, (iii) between the negative electrode current collector terminal 17 and the laminate casing 2a, and (iv) between the negative electrode current collector terminal 17 and the laminate casing 2b.

Note that instead of using a combination of the two laminate casings 2a and 2b, a single laminate casing may be used which is formed by folding back one laminate film having a cup portion formed therein.

Figure 2:
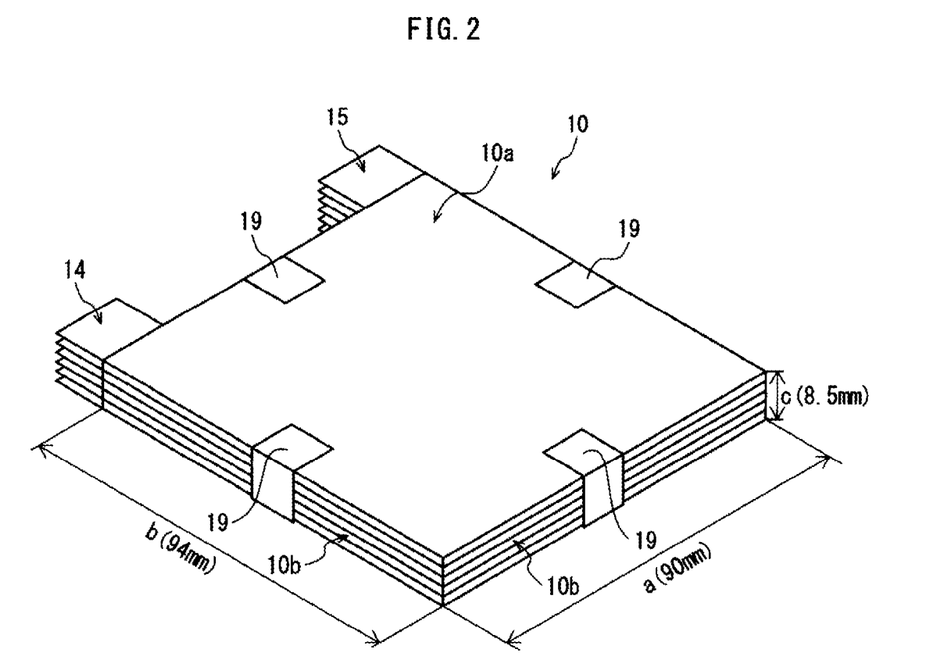
FIG. 2 is a perspective view illustrating a structure of a stacked electrode assembly 10.
Figure 3:
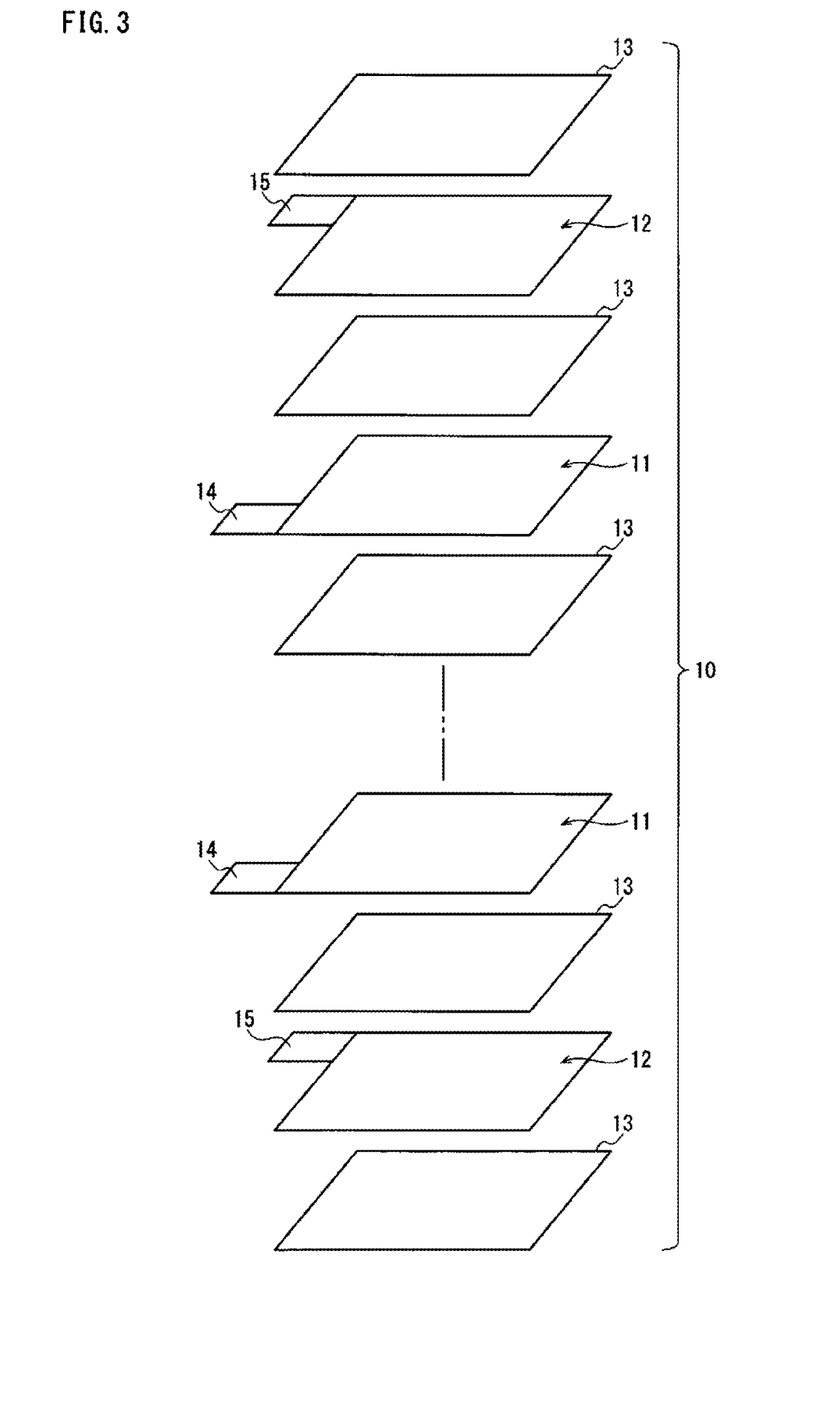
FIG. 3 is an exploded view illustrating the structure of the stacked electrode assembly 10.

FIG. 2 is a perspective view illustrating an external appearance of the stacked electrode assembly 10, and FIG. 3 is an exploded view of the stacked electrode assembly 10.

The stacked electrode assembly 10 has a flat shape, has a main surface 10a and side surfaces 10b each having a smaller area than the main surface 10a. The stacked electrode assembly 10 is composed of positive electrode plates 11 and negative electrode plates 12 that are alternately stacked one on top of another with a separator interposed between each stacked combination of a positive electrode plate 11 and a negative electrode plate 12. A portion of the stacked electrode assembly 10 excluding positive electrode current collector tabs and negative electrode current collector tabs has a substantially cubic shape and exhibits a quadrilateral shape in plan view.

Each positive electrode plate 11 has a structure in which a positive electrode active material layer composed of a mixture of a positive electrode active material, a binding agent, and a conductive agent is provided on either one or both sides of a positive electrode conductive core composed of a quadrilateral piece of aluminum foil.

The positive electrode active material may be, for instance, $LiCoO_2$, $LiNiO_2$, $LiMn_2O_4$, or combinations thereof.

In addition, a positive electrode current collector tab 14 protrudes from an upper side (a side corresponding to the lateral side of the sealed combination of the laminate casing 2a and the laminate casing 2b) of each positive electrode plate 11. The positive electrode current collector tab 14 is integrally formed with the positive electrode conductive core while not being provided with the positive electrode active material layer.

Each negative electrode plate 12 has a structure in which a negative electrode active material layer composed of a mixture of a negative electrode active material and a binding agent is provided on one or both sides of a negative electrode conductive core composed of a quadrilateral piece of copper foil.

The negative electrode active material may be, for instance, natural or artificial graphite.

A negative electrode current collector tab 14 protrudes from an upper side (a side corresponding to the lateral side of the sealed combination of the laminate casing 2a and the laminate casing 2b) of each negative electrode plate 12. The negative electrode current collector tab 14 is formed integrally with the negative electrode conductive core.

A separator 13 is a microporous membrane composed of polyethylene (PE) or polypropylene (PP).

The positive electrode current collector tabs 14 are overlaid one on top of another and are welded as a group to one side of the positive electrode current collector terminal 16. The negative electrode current collector tabs 15 are overlaid one on top of another and are welded as a group to one side of the negative electrode current collector terminal 17.

The positive electrode current collector terminal 16 is formed from an aluminum plate and the negative electrode current collector terminal 17 is formed from a copper plate. Alternatively, each of the positive electrode current collector terminal 16 and the negative electrode current collector terminal 17 may be formed from a nickel plate.

The non-aqueous electrolyte solution is a solution in which a supporting electrolyte is dissolved in a non-aqueous solvent. Examples of the non-aqueous solvent include solvents obtained by combining carbonate solvents such as ethylene carbonate (EC), diethyl carbonate (DEC), propylene carbonate (PC), γ-butyrolactone (GBL), ethyl methyl carbonate (EMC), and dimethyl carbonate (DMC).

Examples of the supporting electrolyte include $LiBF_4$, $LiPF_6$, $LiN(SO_2CF_3)_2$ and the like. Alternatively, a polymer electrolyte may be used instead of the non-aqueous electrolyte solution.

As illustrated in FIG. 2, pieces of tape 19 are adhered to the outer surfaces of the stacked electrode assembly 10 so as to extend across the stacked electrode assembly 10 in a stacking direction.

<Characteristics of Laminate Outer Casing 2a>

Figure 4:
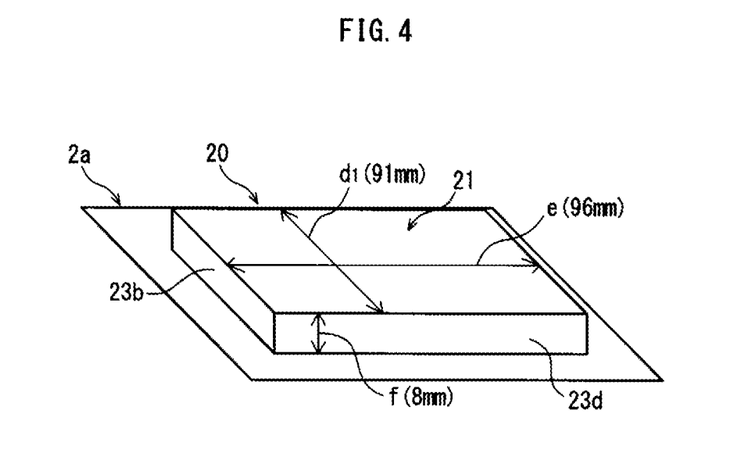

In the laminate casing 2a, a base portion 21 of the cup portion 20 has a rectangular shape with four sides 22a, 22b, 22c, and 22d. The sides 22a and 22b are sides extending in a lateral direction of the laminate battery 1, whereas the sides 22c and 22d are sides extending in a longitudinal direction of the laminate battery 1.

Figure 5:
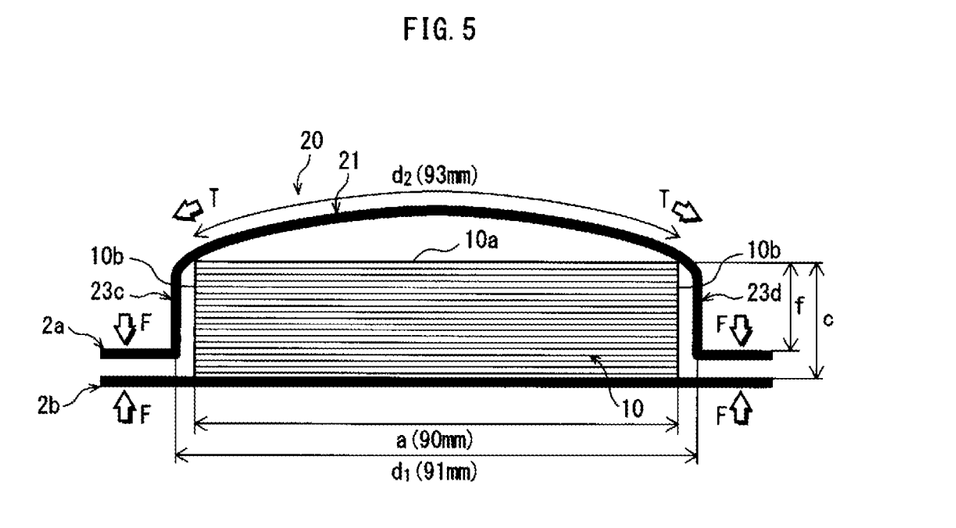
FIG. 5 illustrates a cross-sectional shape of the laminate battery 1 before sealing.
Figure 6:
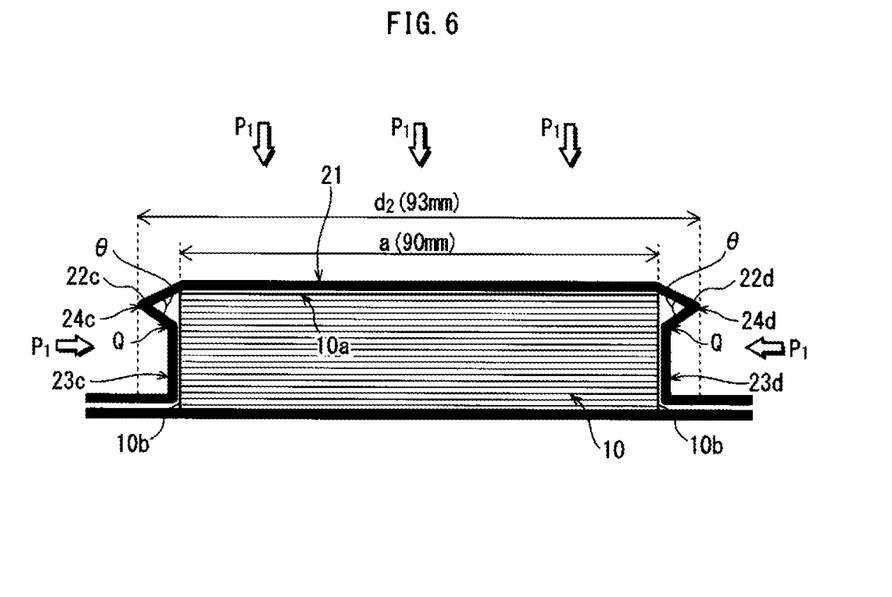
FIG. 6 is a cross-sectional view of the laminate battery 1 taken along line A in FIG. 1.

FIG. 6 illustrates a lateral cross-section of the laminate battery 1 taken along a line (line A illustrated in FIG. 1) parallel to sides 22a and 22b. FIG. 5 illustrates a shape of the lateral cross section of the laminate battery 1 before sealing is performed.

First, description is provided on the structure of the laminate battery 1 in the lateral direction, with reference to FIGS. 5 and 6.

As illustrated in FIG. 6, in the lateral cross section of the laminate battery 1, the cup portion 20 includes the base portion 21 that covers a main face 10a of the stacked electrode assembly 10, bend portions 24c and 24d, and side portions 23c and 23d. The bend portions 24c and 24d extend from the base portion 21 beyond corresponding side faces 10b of the stacked electrode assembly 10, form bends towards the corresponding side faces 10b, and respectively connect with the side portions 23c and 23d. In addition, an angle of a vertex of each of the bend portions 24c and 24d is set so as to be within a range of 40°-85°.

In other words, a boundary region between the base portion 21 and the side portion 23c and a boundary region between the base portion 21 and the side portion 23d respectively form a protruding portion 24c (i.e., the bend portion 24c) and a protruding portion 24d (i.e., the bend portion 24d) and each protrude outwards with respect to a corresponding one of the side faces 10b of the stacked electrode assembly 10. In addition, an angle Θ of a vertex of each of the protruding portions 24c and 24d is within a range of 40° to 85° inclusive.

Here, it should be noted that, in actual implementation, the vertex of the bend portions (the protruding portions) 24c and 24d are rounded to some extent. As such, the angle of the vertex of each of the bend portions 24c and 24d is determined by (i) approximating a cross-section of a bend formed beyond the corresponding side face 10b of the electrode assembly 10 with lines (i.e., approximating the protruding portions 24c and 24d with triangles) and (ii) setting the angle of a vertex of the approximated cross-section as the angle of the vertex of each of the bend portions (the protruding portions) 24c and 24d.

A shape of a longitudinal cross-section of the laminate battery 1 is similar to the shape of the lateral cross-section of the laminate battery 1 illustrated in FIGS. 5 and 6. More specifically, in the longitudinal cross-section of the laminate battery 1, the cup portion 20 includes the base portion 21 that covers the main face 10a of the stacked electrode assembly 10, bend portions 24a and 24b, and side portions 23a and 23b. The bend portions 24a and 24b extend from the base portion 21 beyond corresponding side faces 10b of the stacked electrode assembly 10, form bends towards the corresponding side faces 10b, and respectively connect with the side portions 23a and 23b. In other words, a boundary region between the base portion 21 and the side portion 23a and a boundary region between the base portion 21 and the side portion 23b respectively form a protruding portion 24a (i.e., the bend portion 24a) and a protruding portion 24b (i.e., the bend portion 24b). In addition, an angle Θ of a vertex of each of the bend portions 24a and 24b (protruding portions 24a and 24b) is set so as to be within a range of 40°-85°.

<Advantageous Effects Realized by Laminate Battery 1>

As description is provided in the following, the laminate battery 1 reduces the risk of wrinkles being formed in the base portion 21 due to the laminate casing 2a being provided with the above-described characteristics.

First, description is provided viewing the laminate battery 1 from the lateral direction. In the laminate battery 1, the laminate casings 2a and 2b are sealed together with a reduced pressure interior. As such, pressing force P1 is applied to the base portion 21 and the side portions 23c and 23d of the cup portion 20 such that (i) the base portion 21 is pressed against and thereby put into close contact with the main face 10a of the stacked electrode assembly 10 and (ii) the side portions 23c and 23d are pressed against and thereby put into close contact with the corresponding side faces 10b of the stacked electrode assembly 10.

Here, as description has been provided above, in the lateral cross-section of the laminate battery 1, the cup portion 20 includes the base portion 21 that covers the main face 10a of the stacked electrode assembly 10, the bend portions (the protruding portions) 24c and 24d, and the side portions 23c and 23d. The bend portions 24c and 24d extend from the base portion 21 beyond corresponding side faces 10b of the stacked electrode assembly 10 and form bends towards the corresponding side faces 10b. In other words, the protruding portion 24c and the protruding portion 24d are respectively formed at the boundary region between the base portion 21 and the side portion 23c and the boundary region between the base portion 21 and the side portion 23d, and protrude outwards with respect to a corresponding one of the side faces 10b of the stacked electrode assembly 10. In addition, an angle Θ of a vertex of each of the protruding portions 24c and 24d is equal to or smaller than 85°. As such, a root portion Q of each of the protruding portions 24c and 24d, which is located in the periphery of the corresponding one of the side portions 23c and 23d, is depressed towards the stacked electrode assembly 10, and thereby forms a crease.

As described in detail later in the description provided on a manufacturing method for manufacturing the laminate battery 1, before sealing is performed of the laminate casings 2a and 2b, looseness exists in the base portion 21 of the cup portion 20 as illustrated in FIG. 5. Due to this, the length of the base portion 21 is longer than actually required in the laminate casing 2a before sealing is performed. However, when sealing is performed of the laminate casings 2a and 2b while putting an interior of the combination of the laminate casings 2a and 2b in a reduced pressure state, the shape of the cup portion 20 changes into the above-described shape. As a result, the looseness existing in the base portion 21 before sealing is performed is pulled into the side portions 23c and 23d, and thus, the excess of the length of the base portion 21 is absorbed. Therefore, the risk of wrinkles being formed in the base portion 21 is low.

In the meantime, when the angle Θ of the vertex of each of the protruding portions 24c and 24d is set to be inappropriately small, the risk increases of cracks being formed at the vertices due to excessive load being exerted thereon. However, in the laminate battery 1, since the angle Θ of the vertex of each of the protruding portions 24c and 24d is set to be equal to or greater than 40°, the load exerted on the vertices is suppressed so as to be relatively small.

In addition, since the longitudinal cross-section of the laminate battery 1 has a shape similar to the lateral cross-section of the laminate battery 1 illustrated in FIGS. 5 and 6, the risk of wrinkles being formed in the longitudinal direction of the base portion 21 is suppressed in a similar manner as in the lateral direction.

As description has been provided up to this point, the risk of wrinkles being formed in the base portion 21 is low in both the longitudinal direction of the base portion 21 and the lateral direction of the base portion 21 after sealing is performed of the laminate casings 2a and 2b while putting the interior of the combination of the laminate casings 2a and 2b in a reduced pressure state. Accordingly, pressure is applied evenly to all areas of the main face 10a of the stacked electrode assembly 10. As such, battery reaction occurs evenly at all areas of the stacked electrode assembly 10, and a laminate battery having excellent cycling and power output characteristics is realized.

Here, not that in a conventional laminate battery, the risk of wrinkles being formed in the base portion 21 of the cup portion 20 following the sealing of the laminate casing is high particularly when a longitudinal length e and a lateral length d1 of the cup portion 20 are each equal to or greater than 90 mm and a depth f of the cup portion 20 is equal to or greater than 5 mm. However, since the formation of wrinkles is suppressed in the laminate battery 1 as description is provided above, a great effect is achieved.

In the laminate battery 1, the formation of wrinkles in both the longitudinal and lateral directions of the base portion 21 of the cup portion 20 is suppressed by the protruding portions 24a and 24b being formed extending in the longitudinal direction from the base portion 21 of the cup portion 20 and the protruding portions 24c and 24d being formed extending in the lateral direction from the base portion 21 of the cup portion 20 as description has been provided in the above. However, by forming protruding portions extending from the base portion 21 in either the longitudinal direction or the lateral direction, the formation of wrinkles in the corresponding direction of the base portion 21 can be prevented.

<Method for Manufacturing Laminate Battery 1>

The following describes an example of an implementation of a method for manufacturing the laminate battery 1.

[Preparation of Positive Electrode Plate 11]

A positive electrode slurry is prepared by combining LiCoO$_2$, used as the positive electrode active material, at 90 wt %, Carbon Black, used as the conductive agent, at 5 wt %, and polyvinylidene fluoride, used as the binding agent, at 5 wt %, and an appropriate amount of N-methyl-2-pyrrolidone (NMP) solution, used as the solvent.

The resulting slurry is then applied to both sides of a positive electrode conductive core composed of aluminum foil (15 μm in thickness). After drying and compression to a thickness of 0.1 mm with a milling roller, the positive electrode conductive core is cut into a predetermined shape. Through the above-described procedures, a positive electrode plate 11 having a positive electrode current collector tab 14 is prepared.

The positive electrode plate 11 has, for example, a lateral length of 85 mm and a longitudinal length of 85 mm, while the positive electrode current collector tab 14 has, for example, a lateral length of 30 mm and a longitudinal length of 20 mm.

[Preparation of Negative Electrode Plate 12]

A slurry is prepared by combining graphite powder, used as the negative electrode active material, at 95 wt %, a binding agent (carboxymethyl cellulose and styrene-butadiene) at 5 wt %, and water.

Subsequently, the slurry is applied to both sides of a negative electrode conductive core, which is composed of copper foil (10 μm in thickness), by applying a doctor blade method. After drying and compression to a thickness of 0.08 mm with a roller, cutting into a predetermined shape is performed. Through the above-described procedures, a negative electrode plate 12 is prepared.

The negative electrode plate 12 has, for example, a lateral length of 90 mm and a longitudinal length of 90 mm, while the negative electrode current collector tab 14 has, for example, a lateral length of 30 mm and a longitudinal length of 20 mm.

[Preparation of Stacked Electrode Assembly 10]

A positive electrode plate 11 is wrapped by interposing the positive electrode plate 11 between a pair of separators 13 composed of polypropylene and by welding three sides of the positive electrode plate 11, excluding the side from which the positive electrode current collector tab 14 protrudes, with the separators 13. Further, 35 sheets of the wrapped positive electrode plate 11 and 36 sheets of the negative electrode plate 12 are stacked alternately, whereby the stacked electrode assembly 10 is prepared.

Each of the separators 13 has a lateral length of 90 mm, a longitudinal length of 94 mm, and a thickness of 30 μm.

The outer surfaces of the stacked electrode assembly 10 are fixed in place by using tapes 19.

In this case, the stacked electrode assembly 10 prepared in the above-described manner had a thickness of 8.5 mm.

Subsequently, the positive electrode current collector tabs 14 protruding from the stacked electrode assembly 10 are welded to the positive electrode current collector terminal 16 by using ultrasonic welding. Similarly, the negative electrode current collector tabs 15 protruding from the stacked electrode assembly 10 are welded to the negative electrode current collector terminal 17 by using ultrasonic welding. The positive electrode current collector terminal 16 is composed of an aluminum plate, and the negative electrode current collector terminal 17 is composed of a copper plate. The positive electrode current collector terminal 16 and the negative electrode current collector terminal 17 have a common thickness of 0.4 mm.

[Formation of Laminate Outer Casing]

The laminate casing 2a is prepared by shaping a laminate sheet so as to form the cup portion 20 therein as illustrated in FIG. 4.

The cup portion 20 has a lateral length d1 of 91 mm, a longitudinal length e of 96 mm, and a depth (height of side portions) f of 8 mm.

Here, it should be noted that the base portion 21 of the cup portion 20 is extended so as to form looseness therein. As such, the base portion 21 of the cup portion 20 had a lateral length d2 of 93 mm and a longitudinal length e of 98 mm.

[Enclosure of Electrode Assembly and Electrolyte Solution in Laminate Outer Casing]

The stacked electrode assembly 10 is disposed so as to be housed in the cup portion 20 of the laminate casing 2a, and an aperture of the cup portion 20 is covered with use of the laminate casing 2b.

As illustrated in FIG. 5, the lateral length d1 (91 mm) of the cup portion 20 is set so as to be greater than a lateral length a (90 mm) of the stacked electrode assembly 10, whereas the depth f (8 mm) of the cup portion 20 is set so as to be smaller than a thickness c (8.5 mm) of the stacked electrode assembly 10.

Further, heat-welding is performed such that, among the four sides of the outer edge portions of the combination of the laminate casings 2a and 2b, three sides other than the one side penetrated by the positive electrode current collector terminal 16 and the negative electrode current collector terminal 17 are sealed.

In this heat-welding procedure, the outer edge portions of the combination of the laminate casings 2a and 2b are heat-welded by application of pressure and heat as indicated by outline arrows F in FIG. 5.

Since the depth f of the cup portion 20 is smaller than the thickness c of the stacked electrode assembly 10 as described above, the cup portion 20 is pulled in the heat-welding procedure, and accordingly, the looseness existing in the base portion 21 before sealing is performed is reduced by application of tension T.

Here, when the depth f of the cup portion 20 is equal to or greater than the thickness c of the stacked electrode assembly 10, it is likely that the looseness in the base portion 21 remains present even after the heat-welding procedure. In addition, in such a case, it is likely that the angle Θ of the vertex of each of the protruding portions falls below 40°. In contrast, by forming the cup portion 20 to have a small depth f, the looseness in the base portion 21 can be reduced to a greater extent through the heat-welding procedure by causing the cup portion 20 to be pulled. However, when the cup portion 20 is formed to have an excessively small depth f, the tension T applied to the base portion 21 becomes excessively great, and further, the risk of the angle Θ of the vertex of each of the protruding portions exceeding 85° increases. Taking the above into consideration, it is desirable that the depth f of the cup portion 20 be set so that a value of $(d1-a)/2-(c-f)$ is within a range of 0-1 mm.

Note that when d1, a, c, and f take the respective values described above, the value of $(d1-a)/2-(c-f)$ is zero.

Successively, a non-aqueous electrolyte solution is injected from the one side of the outer edge portions of the combination of the laminate casings 2a and 2b remaining unsealed. Following the injection of the non-aqueous electrolyte solution, heat-welding is performed to provide sealing between the combination of the laminate casings 2a and 2b at the one side remaining unsealed up to this point.

As the non-aqueous electrolyte solution, a solution is used in which $LiPF_6$ is dissolved at a concentration of 1 M (i.e., 1 mole per liter) in a mixture solvent including ethylene carbonate (EC) and methyl ethyl carbonate (MEC) at a 30:70 ratio by volume.

The manufacturing of the laminate battery 1 is completed by sealing the one side remaining unsealed of the combination of the laminated outer casings 2a and 2b by welding while putting an interior of the combination of the laminated outer casings 2a and 2b in a reduced pressure state of a vacuum degree of 90% (i.e., 0.01 MPa).

Through this pressure-reduction sealing procedure, the base portion 21 is pressed against and put in close contact with the main surface 10a of the stacked electrode assembly 10 by atmospheric pressure P1. Similarly, the side portions 23a through 23d of the cup portion 20 are pressed against and put into close contact with the corresponding side surfaces 10b of the stacked electrode assembly 10 by atmospheric pressure P1. As a result, the protruding portions 24a through 24d are formed and the root portions Q of the protruding portions 24a through 24d are provided with shapes depressing towards the corresponding side surfaces 10b of the stacked electrode assembly 10.

Figure 7:
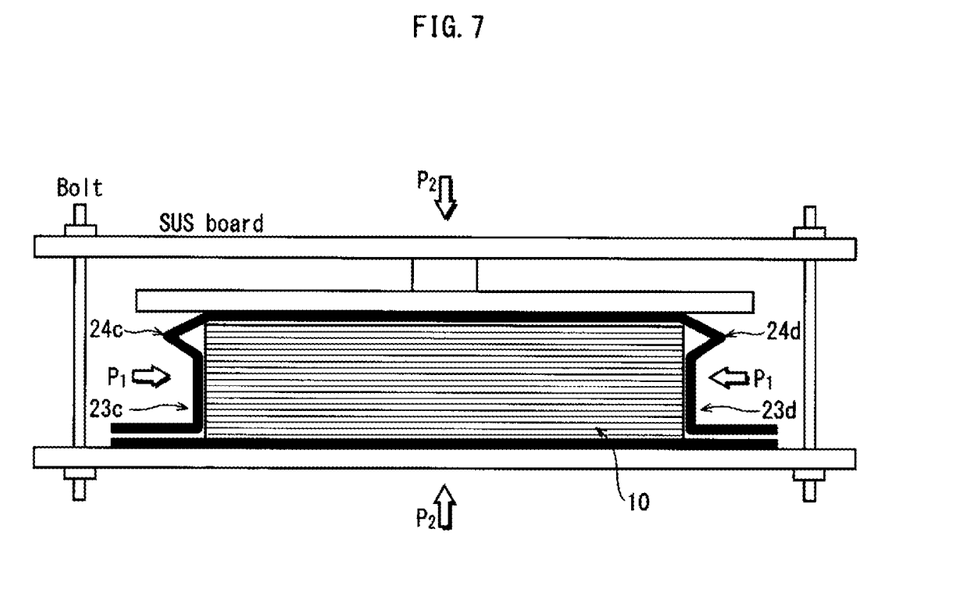
FIG. 7 illustrates a method for sealing a laminated outer casing while putting an interior thereof in a reduced pressure state.

FIG. 7 illustrates one example of a method for performing pressure-reduction sealing of the laminate casing.

By putting an SUS board in contact with the base portion 21 of the cup portion 20 and fastening the SUS board with respect to the base portion 21 by using a bolt, pressing force P2 is applied to the SUS board, and the SUS board applies pressure to the entirety of the base portion 21.

By performing the pressure-reduction sealing procedure while pressing the base portion 21 with a pressing member (i.e., the SUS board), atmospheric pressure P1 is applied to the side portions 23a through 23d while pressing force P2 is applied to the base portion 21 by the SUS board. As such, the formation of wrinkles in the base portion 21 of the cup portion 20 is prevented with a higher degree of certainty, and at the same time, the protruding portions 24a through 24d can be formed so as to have well-regulated shapes.

<Modifications, Etc.>

In the description provided above, among the laminate casing 2a and 2b included in the laminate battery 1, the laminate casing 2a has the cup portion 20 formed therein while the laminate casing 2b does not have a cup portion formed therein. However, the present invention is not limited to this, and similar effects can be achieved by forming cup portions in both the laminate casing 2a and the laminate casing 2b and providing the cup portions with shapes similar to the cup portion 20. In such a case, it is desirable that the forming of the cup portions be performed such that a total of the depths of the two cup portions are set so as to be smaller than the thickness of the stacked electrode assembly.

In addition, description is provided above that the laminate battery 1 includes, as an electrode assembly, a stacked electrode assembly. The present invention achieves a great effect in suppressing the formation of wrinkles in the base of the cup portion especially in a laminate battery including a stacked electrode assembly as represented by the laminate battery 1. However, the present invention is not limited to this, and may be implemented in a laminate battery including a flat spiral electrode assembly. Even in such a case, the same effect of suppressing the formation of wrinkles in the base of the cup portion can be realized.

INDUSTRIAL APPLICABILITY

The present invention is applicable to a laminate battery that is used as a power source for portable devices, robots, and electric vehicles and as a backup power supply.

The invention claimed is:

1. A laminate battery comprising:
a flat electrode assembly having a main face and a side face having a smaller area than the main face; and
a laminate casing having a cup portion that is capable of housing therein the electrode assembly,
wherein the laminate casing is sealed with the electrode assembly housed in the cup portion and has a reduced pressure interior,
wherein the cup portion includes:
a base portion that covers the main face of the electrode assembly;
a side portion that extends along the side face of the electrode assembly; and
a bend portion that extends from the base portion beyond the side face of the electrode assembly, forms a bend towards the side face of the electrode assembly, and connects with the side portion,
wherein an angle of a vertex of the bend is within a range of 40° to 85° inclusive,
wherein the base portion of the cup portion has a rectangular shape,
wherein lengths of the longitudinal and lateral sides of the base portion are equal to or greater than 90 mm, and
wherein a depth of the cup portion is equal to or greater than 5 mm.

2. The laminate battery of claim 1, wherein
the electrode assembly is a stacked electrode assembly, in which positive electrode plates and negative electrode plates are alternately stacked one on top of another with a separator interposed between each stacked combination of a positive electrode plate and a negative electrode plate.

3. A manufacturing method for manufacturing a laminate battery, the manufacturing method comprising:
a forming step of forming a laminate body by forming a cup portion in a laminate sheet, the cup portion capable of housing therein a flat electrode assembly having a main face and a side face having a smaller area than the main face;
a disposing step of disposing the electrode assembly so as to be housed in the cup portion of the laminate body; and
a sealing step of sealing the laminate body by covering an aperture of the cup portion of the laminate body with use of a laminate sheet while putting an interior of the laminate body in a reduced pressure state,
wherein the cup portion, when formed in the forming step, includes a base portion that covers the main face of the electrode assembly and a side portion that covers the side face of the electrode assembly, the base portion having a rectangular shape and a length of sides of the base portion at least in one of a longitudinal direction and a lateral direction is longer than a length of the electrode assembly in a corresponding direction,
wherein the cup portion, after the laminate body is sealed in the sealing step, includes a base portion that covers the main face of the electrode assembly, a side portion that extends along the side face of the electrode assembly, and a bend portion that extends from the base portion beyond the side face of the electrode assembly, forms a bend towards the side face of the electrode assembly, and connects with the side portion, an angle of a vertex of the bend being within a range of 40° to 85° inclusive,
wherein lengths of the longitudinal and lateral sides of the base portion are equal to or greater than 90 mm, and
wherein a depth of the cup portion is equal to or greater than 5 mm.

4. The manufacturing method of claim 3, wherein
in the sealing step, the laminate body is sealed while the base portion of the cup portion, formed when the cup portion is formed in the forming step, is pressed against the main face of the electrode assembly by using a pressing member.

5. The manufacturing method of claim 3, wherein
a height of the side portion of the cup portion, when formed in the forming step, is smaller than a thickness of the electrode assembly to be disposed in the disposing step.

* * * * *